Nov. 6, 1928.
C. W. CARTER
GRAIN SEPARATOR
1,690,529
Filed Jan. 27, 1927 2 Sheets-Sheet 1
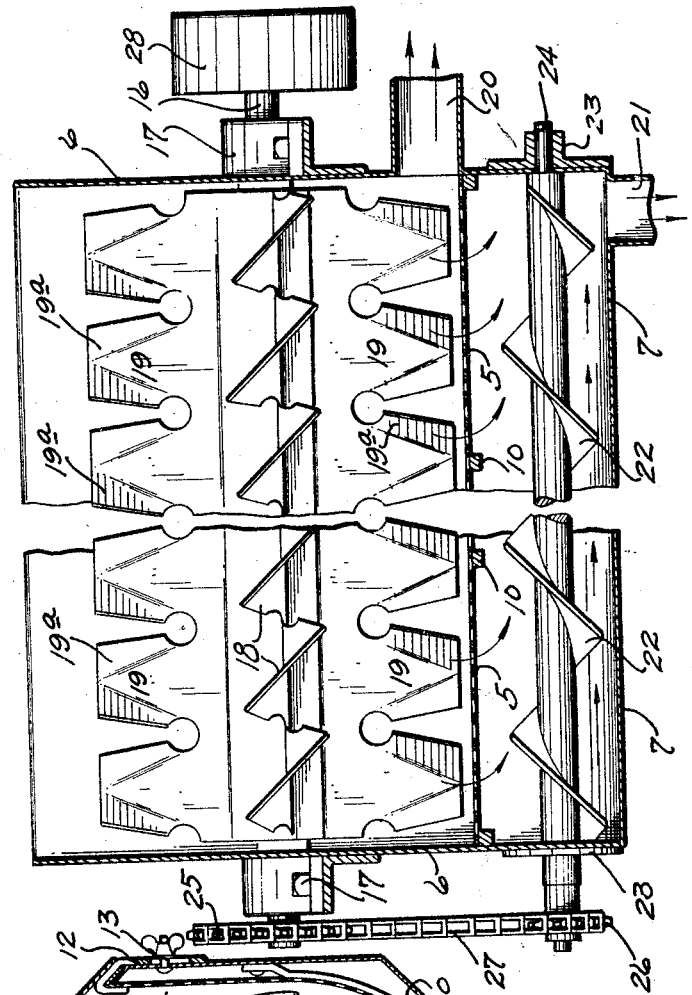
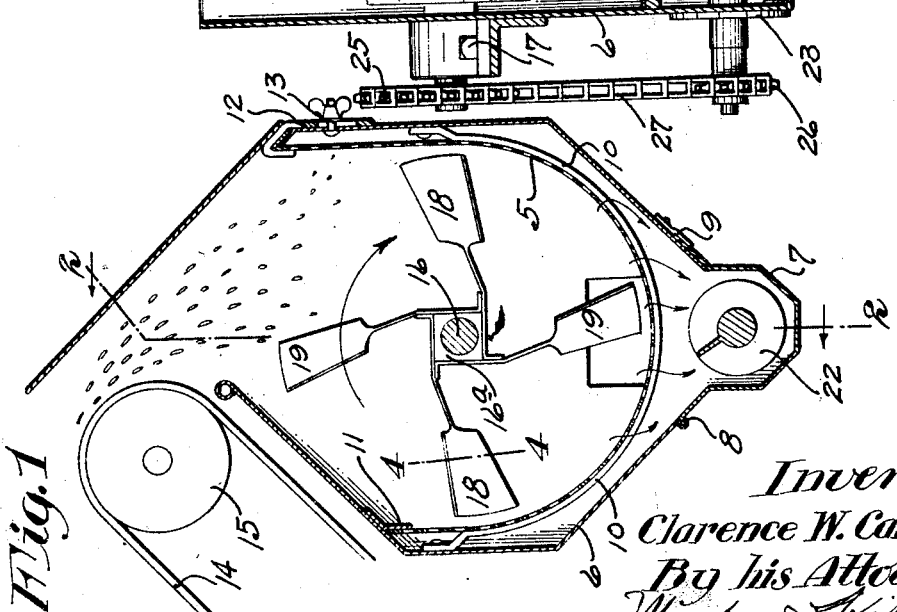
Inventor
Clarence W. Carter
By his Attorneys Nov. 6, 1928.  C. W. CARTER  1,690,529
GRAIN SEPARATOR
Filed Jan. 27, 1927   2 Sheets-Sheet 2

Inventor
Clarence W. Carter
By his Attorneys

Patented Nov. 6, 1928.

1,690,529

UNITED STATES PATENT OFFICE.

CLARENCE W. CARTER, OF MINNEAPOLIS, MINNESOTA.

GRAIN SEPARATOR.

Application filed January 27, 1927. Serial No. 164,004.

My present invention relates to grain separators and, more particularly, to that type of grain separator wherein the screen has a cylindrical surface against which the commingled grain and seeds are arranged to be moved to produce the separating action; and the invention is directed primarily to improved means for producing the movement of the grain over such sieve surface.

It is a well known fact that, in the separation of grains of different kind or of seeds from grain, wherein the stock is moved constantly in one direction, an action which, for example, occurs under rotation of a perforated cylinder or screen, clogging of the sieve perforations is produced almost entirely by lodging of seeds either slightly too large to pass therethrough or of such size as to not pass therethrough without requiring some loosening or agitating movement. Experience has shown that an efficient way to clean out a clogged sieve is to brush or sweep the lodged seeds backward in respect to the direction of movement that caused lodgment thereof in the several perforations.

In accordance with my invention, I provide, within the sieve or container, means for progressively moving the grain or material with a to and fro movement, that is, successively first in the one direction and then in the other but with the progressive movements in the one direction exceeding those in the opposite direction, so that the ultimate result will be a feed movement of the grain and discharge thereof in a predetermined direction. The invention is best carried out by the use of a container in the form of a trough-like perforated sieve having a semi-cylindrical lower portion combined with a rotary shaft having alternated propelling blades, certain of which propel the stock in one direction axially of the sieve and others of which propel the stock in a reverse direction but with a lesser propelling action. The invention also involves certain other important though minor features, as will appear in the description of a commercial form of the separator illustrated in the accompanying drawings.

In the drawings, wherein like characters indicate like parts throughout the several views, Fig. 1 is a transverse section of the separator, showing also means for delivering the commingled grain or seeds into the perforated container;

Fig. 2 is a vertical section taken on the line 2—2 of Fig. 1;

Figure 3:
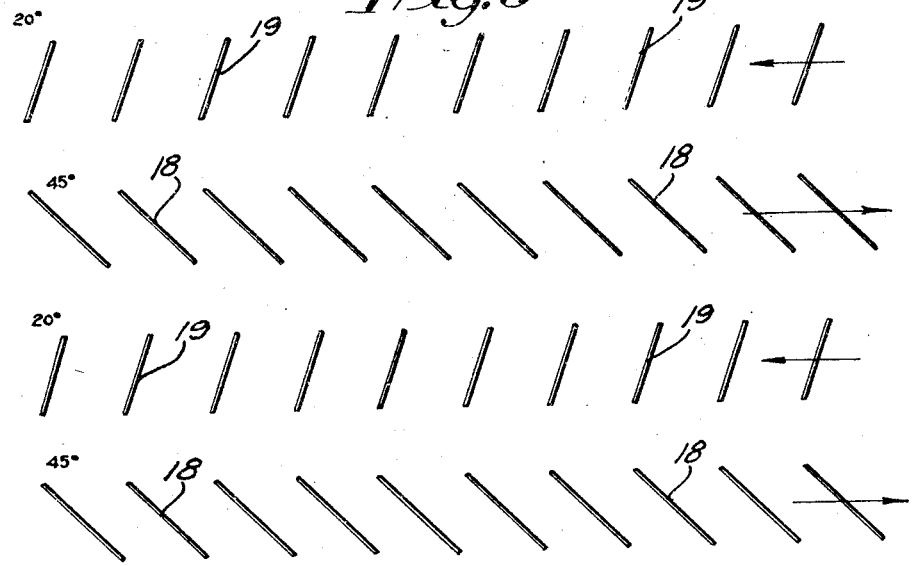
Fig. 3 is a diagrammatic view showing the relation of the outer edge portions of the propeller blades of the rotary shaft or member and indicating said blades as if brought into flat or surface arrangement.

The trough-like perforated sieve 5, in this preferred arrangement, is set within a larger somewhat trough-like-shaped housing 6, which, at its bottom, has a gathering trough 7, which, as shown, is hinged to the housing 6 at 8 and at its opposite edge is normally held by a pivoted latch or turnbutton 9. The sieve 5 is preferably a perforated zinc plate capable of being readily bent to the form shown and, in the preferred structure illustrated, it is seated at its ends on saddle straps 10, the ends of which are rigidly secured to the interior of the housing 6. The inner edge of the sieve 10 is lapped back of a flange 11 on the upper portion of the housing and the other edge thereof is detachably held by hook-like anchor brackets 12 rigidly but adjustably secured to the front side of the housing, as shown, by means of slot and bolt connections 13. The commingled grain or material may be delivered into the container afforded by the sieve, by any suitable means but, as illustrated in Fig. 1, such material will be delivered by a belt 14 that runs over a suitably supported pulley 15.

Figure 4:
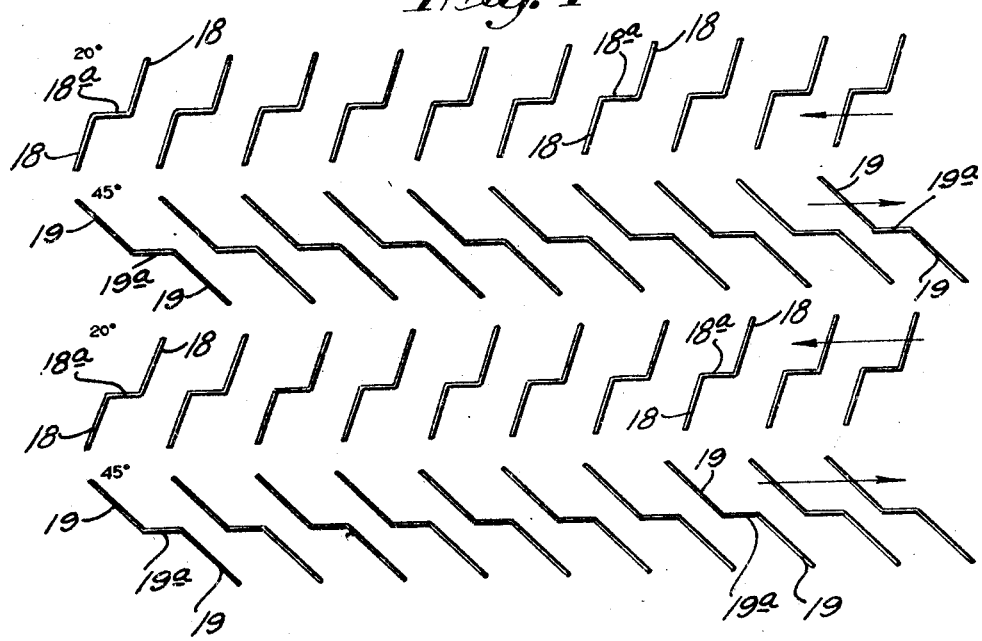
Fig. 4 is a similar view to Fig. 3 but showing the relation of the blades as if sectioned approximately on the line 4—4 of Fig. 1.

Extended axially through the housing and the trough-like sieve is a shaft 16 journalled in suitable bearings 17 secured on the ends of the housing. As illustrated, this shaft 16 has a square portion 16ª to which propelling blades 18 and 19 are rigidly secured. The blades 18 are inclined in reverse directions in respect to the planes in which they rotate, and said blades 18 are set at a greater angle to such plane than are the blades 19. In the machine illustrated, the blades 18 are set at an angle of 45°, while the blades 19 are set at an angle of 20° to the planes of rotation, as best illustrated in Figs. 3 and 4. The blades that are in a common line may conveniently be formed all from a single piece of sheet metal, as best shown in Fig. 2, and as preferably designed, these blades are extended so as to form approximately V-shaped portions 18ª and 19ª that lie in planes at right angles to the planes of rotation, (see particularly Figs. 2 and 4). By reference to Figs. 2 and 3, it will be noted that the outer edge portions of the blades 18 and 19 are straight and set at the reverse angles above stated.

At its delivery end, the housing 6, adjacent the bottom of the sieve 5, is provided with a discharge spout 20, and at the same end of the housing, the spout 7 is provided with a depending discharge spout 21. Working within the trough 7 is a spiral conveyor 22, the shaft of which is journaled in suitable bearings 23 on the ends of said spout. The shafts 16 and the shaft 24 of the spiral conveyor 22 are provided, respectively, with sprockets 25 and 26 over which runs a sprocket chain 27 for driving said conveyor from said shaft 16. The shaft 16 is shown as provided at its opposite end with a pulley 28 over which a power-driven belt, not shown, may be run to impart motion to the running parts of the machine.

This separator may be used for the separation of various different kinds of materials of different size or shape, but for the purposes of this case, we will assume that the material delivered for separation is wheat from which oats have been removed, but which contains more or less small seeds, broken grain and other foreign materials that are smaller than the good wheat. For this kind of separation, the perforations in the sieve 5 should be such that they will not pass good wheat therethrough but will pass the smaller seeds or foreign materials. Attempted clogging of the perforations of the sieve will be caused by foreign materials that are too large to freely pass through the perforations and by some of the smaller grain that is not small enough to pass through the perforations but, nevertheless, small enough to get lodged in the perforations. As heretofore pointed out, when such materials get lodged in the perforations and when the pressure of grain is in a constant direction, they will remain and the perforations will progressively be clogged or filled up. In accordance with my invention, the material thus caught in the perforations will be repeatedly swept backward and dislodged. Applying this description more specifically to the structure illustrated in the drawings, it will be noted that the blades 18 set at an angle of 45° to the plane of rotation will have a much greater propelling action on the stock axially of the sieve than will the reversely set blades 19, which are at the assumed angle of 20° to the plane of rotation. Moreover, the said blades 18 and 19 are circumferentially alternated so that following each propelling action of a blade 18 toward the discharge spout 20, there will be a reverse camming or sweeping action produced by a blade 19, and such reverse sweeping action will dislodge any materials caught in the perforations. These reverse actions will take place repeatedly and over and over again, so that no material will remain lodged in any perforation for any measurable length of time, and the effect of the action is substantially that the materials never become lodged in the perforations and, hence, the sieve operates always at maximum capacity. The direction of rotation of the blade-equipped rotor is indicated by the large arrow marked thereon in Fig. 1.

The result of the alternated propelling actions above described is that small foreign substances will be passed through the sieve and into the gathering trough 7 while the clean wheat will be fed progressively by step by step relatively great advancing movements and alternated lesser backward movements, until it is discharged out through the spout 20.

The flat surfaces 18$^a$ and 19$^a$ on the blades 18 and 19 are very desirable because they cause the blades to pick up the grain, to throw the same against the perforated sieve, and cause the same to be given a circumferential travel over the sieve. The to and fro movement given to the grain by the reversely acting propelling blades not only keeps all of the perforations of the sieve open and operative but accelerate the movement of the grain through the perforations with the result that the efficiency and capacity of the separator is materially increased by these actions. Moreover, the propellers, operating as described, produce a scouring action on the wheat or grain so that the grain delivered from the machine will not only be cleaned of loose foreign substances but will be surface cleaned. This scouring action is very marked when the blade-equipped rotor is rotated at high speed.

From the foregoing, it is evident that the invention herein disclosed, and a preferred form of which has been illustrated in the drawings and specifically described, is capable of a large range of modification, all within the scope of the invention as disclosed and claimed.

What I claim is:

1. A separator of the kind described comprising a sieve and propelling means operative to propel the stock against the sieve with a to and fro movement in a circular path greater in one direction than in the other so that the stock is given a resultant progressive flow in a given direction.

2. A separator of the kind described comprising a relatively fixed sieve and a rotary propeller, the latter having reversely beveled blades, those operated in the one direction having greater bevel than those operating in the other direction, whereby the stock will be fed against said sieve with a to and fro movement in a circular path greater in one direction than in the other so that the stock is given a resultant progressive flow in a given direction.

3. A separator of the kind described comprising a trough-like sieve and a rotary propeller mounted therein, said propeller having circumferentially and longitudinally spaced propelling blades, certain of said blades in each circular series having greater bevel than others, the blades with greatest bevel having greater propelling action than the reversely beveled blades, whereby the stock is given a resultant progressive flow in a given direction.

4. A separator of the kind described comprising a sieve and a cooperating blade-equipped propeller, and means for moving one of said members in respect to the other and thereby to give to the stock on the sieve a progressive to and fro movement in a circular path, the progression in the one direction being greater than the other, so that the stock will be given a resultant progressive flow in a given direction.

5. A separator of the kind described comprising a trough-like sieve having a substantially semi-cylindrical perforated bottom, a rotary propeller working above said sieve, said propeller having longitudinally spaced circumferential series of propelling blades, the propelling blades in a particular series being alternately given bevel in reverse directions, the alternated blades that propel in the one direction having greater bevel than those that propel in the opposite direction, whereby the stock will be given a to and fro movement in a circular path and a resultant flow in a given direction.

6. The structure defined in claim 3 in which there is a discharge passage at that end of the sieve toward which the resultant flow is produced.

7. The structure defined in claim 3 in which there is a discharge passage at that end of the sieve toward which the resultant flow is produced, and in further combination with means for delivering commingled stock into said trough-like sieve.

8. The structure defined in claim 3 in further combination with a housing containing said sieve and provided with a depending gathering trough for the material passed through said sieve.

9. The structure defined in claim 3 in further combination with a housing containing said sieve and provided with a depending gathering trough for the material passed through said sieve, and a conveyer working in said gathering trough, said housing having a discharge passage located above the bottom of said sieve at that end thereof toward which the resultant flow is produced.

In testimony whereof I affix my signature.

CLARENCE W. CARTER.